United States Patent
MacKelvie (10) Patent No.: US 6,722,421 B2
(45) Date of Patent: Apr. 20, 2004

(54) DRAINWATER HEAT EXCHANGER

(76) Inventor: Winston MacKelvie, P.O. Box 1156 20 Kimball Road, Knowlton, Quebec (CA), J0E 1V0

( * ) Notice: Subject to any disclaimer, the term of this patent is extended or adjusted under 35 U.S.C. 154(b) by 0 days.

(21) Appl. No.: 10/156,281

(22) Filed: May 28, 2002

(65) Prior Publication Data

US 2002/0162650 A1 Nov. 7, 2002

Related U.S. Application Data

(63) Continuation-in-part of application No. 09/738,112, filed on Dec. 15, 2000, which is a continuation-in-part of application No. 09/237,611, filed on Jan. 25, 1999, now abandoned.

(51) Int. Cl.[7] .............................. F28D 7/10; F24H 3/00
(52) U.S. Cl. ........................ 165/154; 165/47; 165/140
(58) Field of Search ............................ 165/47, 66, 140, 165/141, 154, 156, 163, 901, 169; 210/774, 175

(56) References Cited

U.S. PATENT DOCUMENTS

| | | | | |
|---|---|---|---|---|
| 4,343,349 A | * | 8/1982 | Busch, Jr. .............. | 165/104.21 |
| 4,502,529 A | * | 3/1985 | Varney ...................... | 165/47 |
| 4,550,771 A | * | 11/1985 | Arbabian ................... | 165/47 |
| H399 H | * | 1/1988 | Johnson et al. .............. | 165/47 |
| 5,736,059 A | * | 4/1998 | Mackelvie ................. | 210/774 |
| 5,740,857 A | * | 4/1998 | Thompson et al. .......... | 165/47 |

FOREIGN PATENT DOCUMENTS

| | | | | |
|---|---|---|---|---|
| DE | 3244600 A | * | 6/1984 | ............ F28D/7/02 |
| GB | 2165932 A | * | 4/1986 | ............ F28D/7/00 |
| JP | 57142488 A | * | 9/1982 | ............ F28D/15/00 |

* cited by examiner

Primary Examiner—Henry Bennett
Assistant Examiner—Tho V Duong (57) ABSTRACT

Vertical and horizontal drainwater heat exchangers have built-in heat storage for continuous heat recovery. The drainwater heat exchanger is a straight, large diameter copper tube having external fins. This tube runs through a reservoir which is filled once on installation with clean water. At least one convection chamber made of insulative material surrounds the tube and has an opening only on top. All heat transfer between the drainwater and the reservoir takes place only when the small volume of water in these convection chambers is heated. A second heat exchanger for heating the cold water supply of the building's hot water heater, comprises a large diameter plastic tube coiled around the reservoir. By inverting the invention and connecting the second heat exchanger to a cold water faucet, water is made colder for drinking.

19 Claims, 13 Drawing Sheets

DRAINWATER HEAT EXCHANGER

The present application is a continuation-in-part of application Ser. No. 09/738,112 filed Dec. 15, 2000 which is a continuation in part of application Ser. No. 09/237,611, filed Jan. 25, 1999 abandoned.

BACKGROUND

A building has several different water flows. One is cold water to end use faucets, a second is cold water to the hot water heater, a third is hot water to end use faucets, and a fourth is used drainwater. The result is complex flow times, flow rates, flow volumes and flow temperatures.

To effectively recover heat from drainwater, one must be able to cool drainwater whenever it flows regardless of the other aforementioned water flows.

Water heaters are well known to consume vast amounts of energy to heat cold water to make it hot for human use in washing and cleaning, and for industrial processes. The resulting hot drainwater (also referred to as wastewater) flows freely to the sewer taking with it all of that heat energy. Generation of energy to heat water releases pollutants including those that cause global warming.

Although it would seem obvious to use heat in drainwater to heat new cold water, thereby reducing energy use and saving money, this seemingly simple heat transfer idea has resisted successful solution in spite of many inventors having tried over a very long time.

It is, therefore, the objective of the present invention to provide a heat exchanger apparatus to remove heat from flowing drainwater, to store that heat within that apparatus, and to limit heat loss of that stored heat to cold drainwater that may flow thereafter.

Another objective is to cool drinking water using cold drainwater.

DESCRIPTION

By way of review, in a building, cold water, always under pressure, flows into the water heater when a hot water faucet is opened. It is that cold water flow that forces the hot water out of that faucet. So when hot water flows, an equal amount of cold water flows into the water heater. In a shower, drainwater is also flowing so all three waters are flowing concurrently.

Drainwater, however, can also flow independent of the other two, as, for example, when a washing machine or a bath drains. The water flows in a building are thus unpredictable as to volume, rate of flow, and temperature.

To recover heat from all drainwater flows, one needs a heat storage medium such as an insulated reservoir of water. Drainwater heat that is recovered and stored must then be able to be transferred into the cold water feeding the water heater whenever it happens to flow.

Drainwater heat recovery involves heating cold water with heat from drainwater. The cold water may feed a water heater thereby saving energy and money.

U.S. Pat. No. 4,619,311, to Vasile, describes a drainwater heat recovery system comprising a copper drainpipe heat exchanger whose exterior is wrapped with a copper coil for cold water to be preheated. This type of tube-on-tube heat exchanger has been long-available, such as that sold by the Solar Research in Brighton, Mich. 48116, as part number 5832. Since the two heat exchangers are in direct physical contact, beneficial heat transfer occurs when both drainwater and cold water are flowing simultaneously as when showering.

However when appliances such as a washing machines or sinks are used, the time delay between filling and draining means that the cold water and the drainwater flow at different times and so there are no useful energy savings. Further, cold drainwater will cool the water in the outer coil. These drawbacks severely limit energy savings.

Further, U.S. Pat. No. 4,619,311, to Vasile is not recommended for horizontal drainpipes found in a great many buildings because the design requires a generally circular drainpipe with no finning upon which to wind the outer coil. This restricts heat transfer to the narrow bottom section of the horizontal drainpipe.

U.S. Pat. No. 5,736,059 to the present applicant, does teach of a drainwater heat recovery system with no-loss heat storage. However, for low volume hot water users, such as in homes, the system tends to be too large and, with its numerous components, too expensive. Further, its installation is essentially limited to vertical drainpipes unless mechanical pumping is added.

The object of the present invention is to provide a low-cost, easy to install drainwater heat exchanger with no-loss heat storage built-in.

A review of the physical principles involved in the present invention follows.

Firstly, when water is heated or cooled, its density changes. Convective flow therefore takes place between colder (heavier) and hotter (lighter) regions.

Secondly, in a vertical pipe or tube, liquid flow is principally a film flow on the wall with no flow down the hollow center.

Thirdly, by adding protrusions to a wall, heat transfer can be improved due to the turbulent flow created.

To achieve one-way heat transfer out of a finned copper drainpipe, in either a vertical or horizontal placement, the present invention uses one or more convection chambers to surround the entire heat transfer surface of the drainpipe. The surrounded drainpipe is submerged in a reservoir of water and a cold water coil is wound around the reservoir. The convection chamber(s) are made of insulative material and are sealed to the drainpipe except for an opening at the top into the reservoir. They fill with a small volume of the reservoir water. In operation, when drainwater flows it's temperature affects only the convection chamber water. If heated, it becomes lighter and naturally flows by convection out the top into the reservoir heating the reservoir water and thus the cold water coil. If cooled, it becomes heavier and remains stationary in the chamber (no convection) thereby blanketing the drainpipe and preventing warmer reservoir water from being cooled.

By this means, the reservoir is heated whenever hot drainwater flows, and, the reservoir is cooled whenever the cold water flows. Simultaneous flow of drainwater and cold water is not required and so continuous drainwater heat recovery from both showers and fill-drain devices such as washing machines, baths and sinks.

In the vertical embodiment, multiple convection chambers are used and in the form of nested cups which are open on top and with a hole in the bottom to slide tightly onto the drainpipe. Finning rings are slid down into the cup before the next cup is installed.

In the horizontal embodiment a single tubular convection chamber with each end sealed to the drainpipe and with dividers creating compartments. A slot along the top of the chamber provides the convective opening for reservoir water to flow into and out of the compartments.

In both embodiments, the convection chamber hold a minimum volume of reservoir water but with sufficient space to allow convection flow in reaction to drainpipe temperature.

Convection chambers may be fabricated from low-cost foamed polyethylene or polypropylene. They may also be made of copper and covered with insulation. For the horizontal embodiment, the convection chamber may be a long, channel-shaped trough which may advantageously be made of metal such as copper and attached directly (i.e., soldered) to the bottom of the copper drainwater to enhance heat transfer. Several such metal channels may be nested to further enhance heat transfer. The outside of the outermost convection chamber channel is covered with an insulating skin.

Finning may be made from coiled copper wire or sheet metal.

The reservoir may be a 'bag' made from plastic film supported by the cold water coil encircling it's exterior. The bag may have a full diameter greater that the external coil to allow bulging of the bag between the outer coil rings thereby adding valuable heat transfer area at no cost.

The larger diameter the plastic tube the better because there will be more volume of water ready for instant delivery to the water heater. Although low-cost plastic conducts heat slowly than expensive copper, the total amount of heat transferred can be the same given the long periods of time involved in real water use in a building.

Multiple drainpipes can be used in one reservoir to maximize heat transfer. Multiple complete units can be connected in series or in parallel where space is a problem.

To increase heat transfer rates, the drainpipe can be pebbled to induce turbulent flow on the interior wall. The drainpipe may also be roll-grooved angularly to slow down flow in horizontal units.

Any shape of drainpipe can be used such as oval.

Miniature drainwater heat recovery systems based on the above described designs may be integrated into the cabinetry of sinks or dish- and laundry washing machines and used with tankless or instantaneous water heaters.

Because indoor plumbing fixtures are heated by ambient air and so even cold water used at the fixture is warmed as it flows over warm fixture and drainpipe surfaces, the system can provide fresh warm water with no need for a traditional hot water supply.

The reservoir of the present invention could be pressurized with fresh water, thus avoiding the cost for the second cold water heat exchanger. This heated water could then be used as feed water for toilets where the heated water would reduce condensation on the exterior of the tank and resultant dripping onto the floor. This dripping is known to cause structural damage, and to support fungus/mold growth which results in dangerous airborne spores in the building.

In yet another embodiment, a thermostatically controlled low wattage heater may be provided within the reservoir to maintain a minimum temperature for use at a site.

Hot drainwater from other sources such as summer roof run off may also be used to heat the cold water.

If the convection chambers are inverted with the convection opening at the bottom, the present invention can serve as a water cooler using colder drainwater to cool warmer fresh water. This arrangement may be practical in hot climates where it is difficult to get cold drinking water in the summer due to high ground temperatures. Such warm 'cold' water when fed into a building can become cooler by evaporative cooling of the fixtures such as standing toilet water. When flushed this colder water can be used to cool the reservoir and the surrounding cold water coil. Small versions of such drainwater cooling units may be used in typical office water coolers to optimize their performance.

Both drainwater heat recovery and drainwater cooling units can be used together to achieve both heating of the cold water being plumbed to the water heater and cooling of the water being plumbed to drinking faucets.

DESCRIPTION OF DRAWINGS

There are two principal embodiments of the present drainwater heat recovery invention. The first embodiment is a horizontal heat exchanger 45. The second embodiment is a vertical heat exchanger 50.

Figure 1:
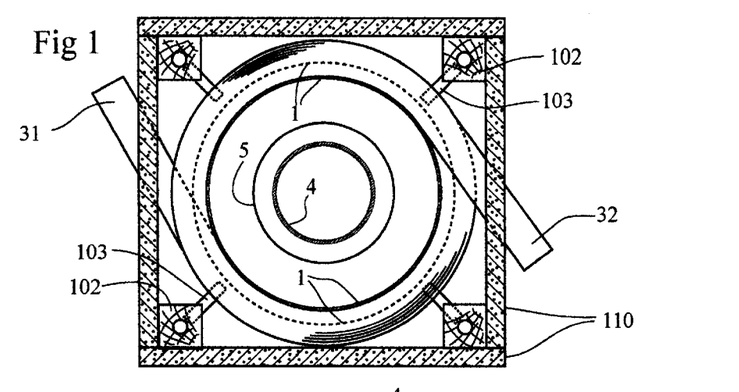
FIG. 1 shows a top view of a vertical embodiment with the top cover removed and showing the membrane reservoir.
Figure 2:
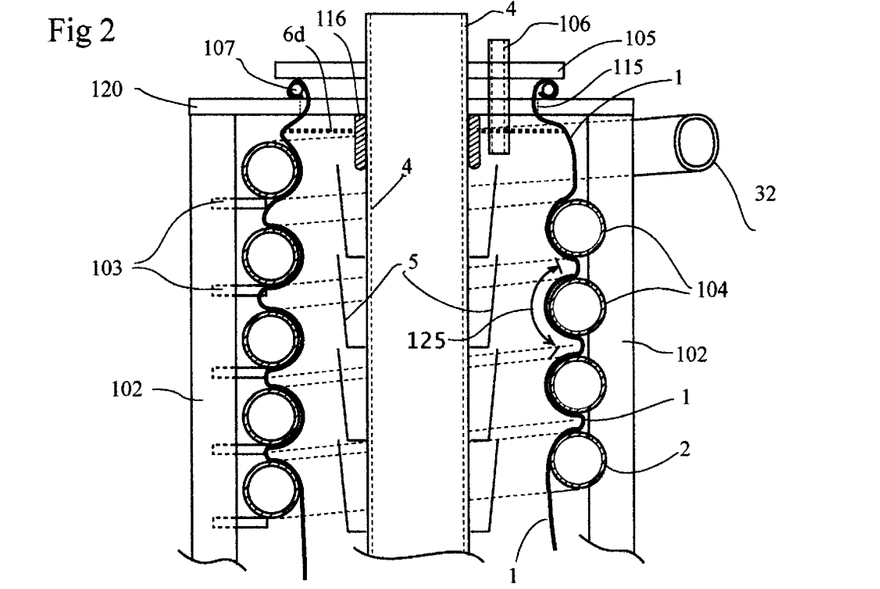
FIG. 2 is a partial cross section side view of the top section of the same embodiment with the insulation removed showing the bulging membrane reservoir.
Figure 3:
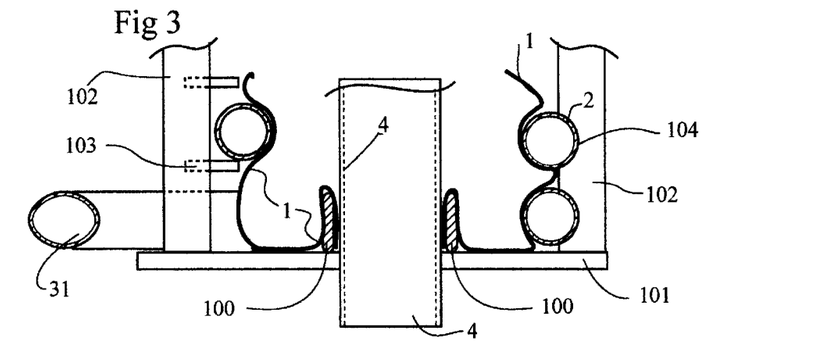
FIG. 3 is a partial cross section side view of the lower section of the same embodiment showing how the membrane reservoir is sealed to the drainpipe heat exchanger.

Each embodiment has a reservoir 1 filled with a water 3 (or other suitable fluid) that serves as both a heat transfer medium and a heat storage medium. The reservoir water 3 is added after installation and remains there forever. A thin plastic (polyethylene film) may be used for reservoir 1 as indicated by both solid and dotted line to indicate the perimeter bulge into the coil gaps, or it may be of more stiff sheet material such as copper. Under the weight of the contained water, the highly flexible film can bulge 125 into the space between the cold water coils 2 and thereby enhance heat transfer from increased thermal contact. The membrane reservoir 1 is shown in FIGS. 1, 2, 3, 4, 10, 15. The solid reservoir 1 is shown in FIGS. 5–7, 9, 11, 12, 16–20, 24, 25, 27, and 29–32. In FIG. 1 is shown construction details to support the coils 2 and membrane reservoir 1 and drainpipe 4 by using pegs 103 in corner posts 102 to which insulation 55 can also be fastened. In details shown in FIG. 2 the membrane reservoir 1 extends out hole 115 in the top plate 120 and forms a roll 107 like in a balloon or condom which is held in place by plate 105. Plate 105 also has a filling tube 106. Sleeve 116 around upper extremity of drainpipe 4 prevents heat transfer above upper most chamber 5 and below water level 6d. In FIG. 3, the bottom details include clamp collar 100 which can be a rubber sleeve that is rolled several time along with the reservoir membrane to form a leak proof seal. Bottom plate also anchors to corner posts 102 and holds the weight. Legs (not shown) can be attached to lower plate 101 for leveling and adjusting the height of the exit end of drainpipe 4 to match the building's plumbing.

Drainpipe 4 may be a straight copper tube or pipe or it may be dimpled by impacting the exterior with shot or small punches. Ribbing and rolled grooves can also be used. A larger diameter can be funnel-fitted to a smaller drain system.

Figure 4:
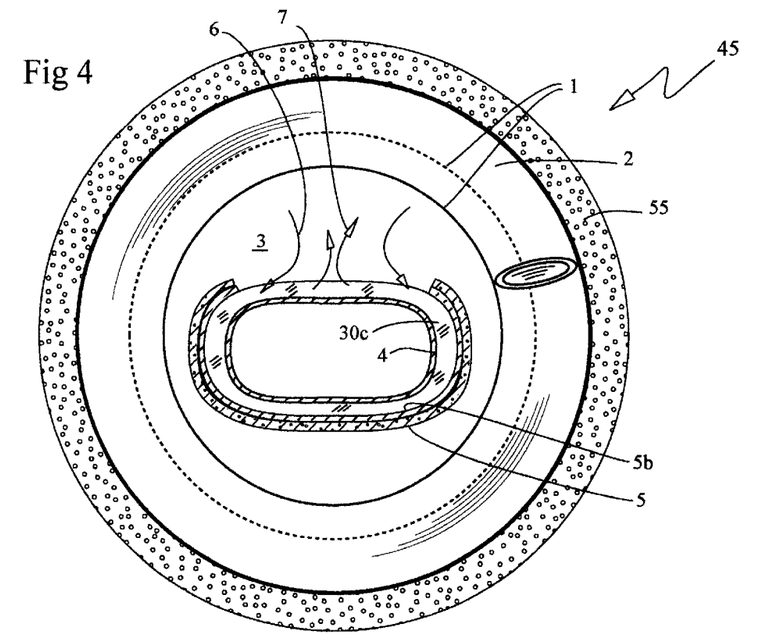
FIG. 4 is a cross section view of a horizontal embodiment having a membrane reservoir and a flattened drainwater heat exchanger and with metal compartment dividers.

Convection chamber 5 is made of plastic material preferably foamed poly to provide maximum insulation between the reservoir water 3 and the chamber water 24. FIG. 4 shows a horizontal drainwater heat exchanger 45 with membrane reservoir 1 indicated with both an inner solid line and with a larger diameter dotted line to indicate the perimeter bulge. The reservoir and its contained water is supported by cold water coil 2. A layer of insulation 55 encloses the unit. An air space around the coil may be provided to allow convective air heat transfer between coil rings. Also an opening at the bottom (not shown) to the outside will allow ambient warm air to enter in summer for additional heating.

Figure 5:
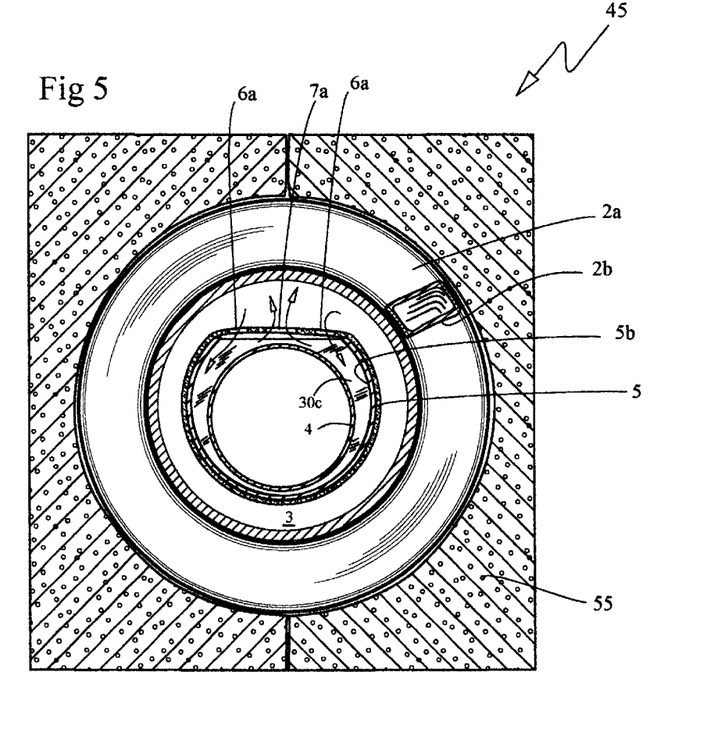
FIG. 5 is a cross section of a horizontal embodiment having a metal reservoir and square tube cold water heat exchanger and metal compartment dividers.

FIGS. 4 and 5 also show the construction of the convection chamber 5 being an insulating sheath and having a copper trough 5b inside to enhance heat transfer from drainpipe 4. The reservoir water 3 moves in and out of the convection chamber as indicated by heavy currents 6 and lighter currents 7. These currents 6, 7 are shown traveling through respective openings 6a and 7a although in practice the convective flow currents will find their own. Dividers 30c are best made a snug fit to both the drainpipe 4 and the trough 5b so as to enhance heat transfer from drainpipe 4 into convection chamber water 24 (see FIG. 11). In FIG. 4 the convection chamber 5 is shown as being flat bottomed which increases heat transfer from a larger contact area with the drainwater 8 (see FIG. 11).

Figures 6, 7, 8, 9:
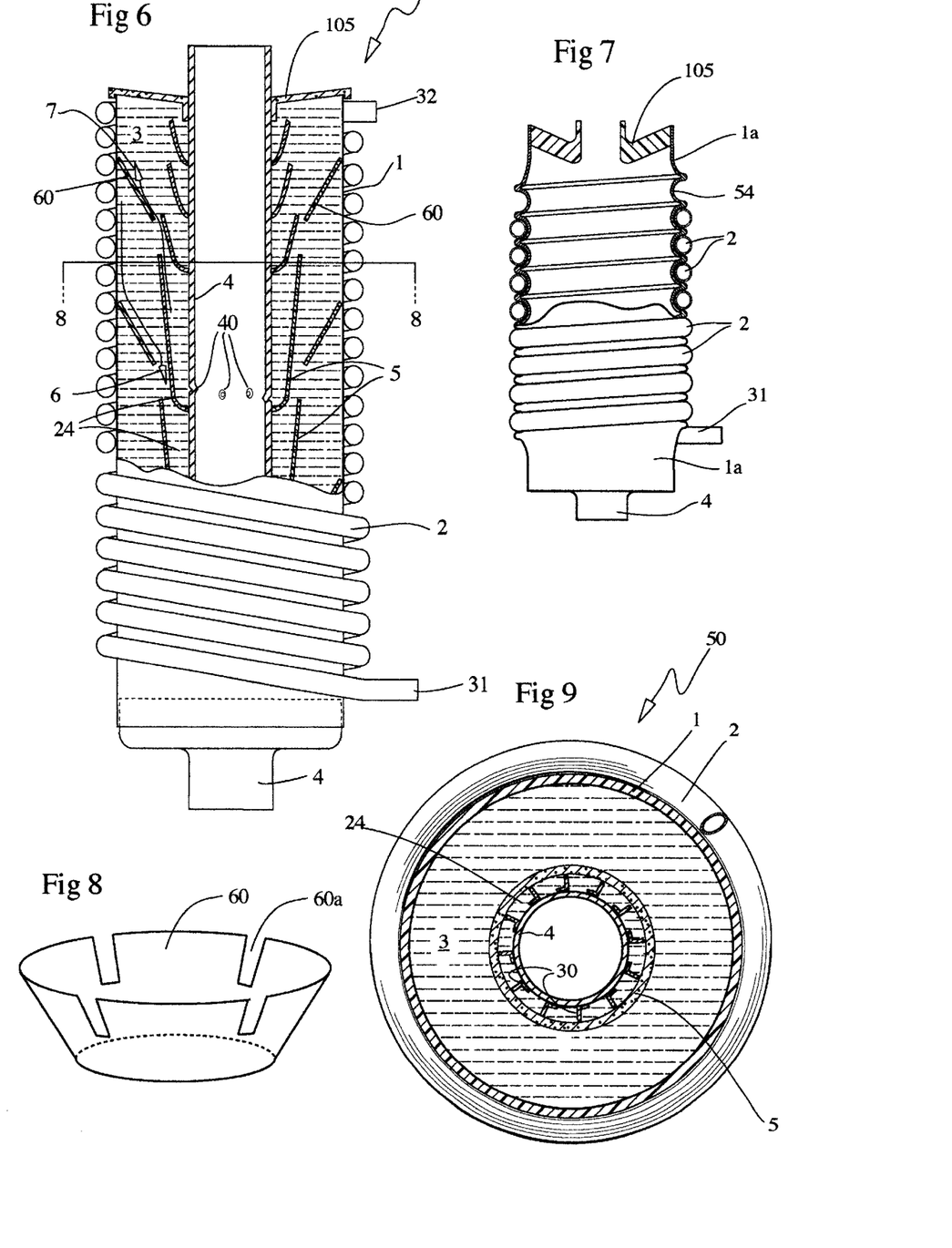
FIG. 6 is a vertical embodiment with a solid reservoir and deflectors and with shortened convection chambers at the top.
FIG. 7 shows a reservoir wall with grooving to increase heat transfer into the cold water coil.
FIG. 8 shows a perspective of a deflector shown in FIG. 6.
FIG. 9 is a cross section of a vertical embodiment with exterior cold water coil and a solid reservoir wall and showing fins on the drainpipe heat exchanger.

FIG. 6 shows a vertical drainwater heat exchanger 50 having a rigid reservoir 1 although a flexible reservoir could also be used. Drainpipe 4 has a set of nested convection chambers 5 that ensures that the chamber water 24 in them completely surrounds the drainpipe 4 which prevents unwanted heat transfer (loss of stored heat) directly with the reservoir water 3. Convection chambers 5 are shown as being shorter at the upper portion of drainpipe 4 so as to not saturate with heat that naturally rises to the upper portion of the reservoir 1. Cap 105 shows a concave form to again provide best heat transfer by adding head space above the topmost convection chamber 5. FIG. 7 shows how a reservoir 1 can be grooved 54 to accommodate cold water coil 2 and increase heat transfer contact area. FIG. 8 shows a deflector 60 as seen in FIG. 6 where the slots 60a provide passage for any rising convection currents. FIG. 9 shows a cross section of a vertical unit 50 with a rigid reservoir 1 and external coil 2 and with fins 30 adjacent the drainpipe 4.

Figure 10:
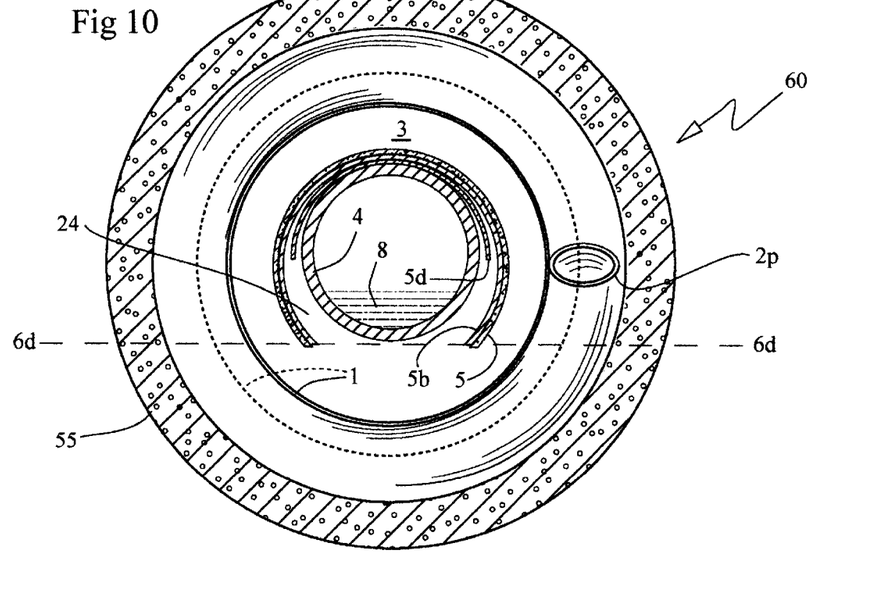
FIG. 10 is a cross section of a horizontal embodiment of a cold water cooling embodiment where the convection chamber is inverted to reject heat into colder drainwater.
Figure 11:
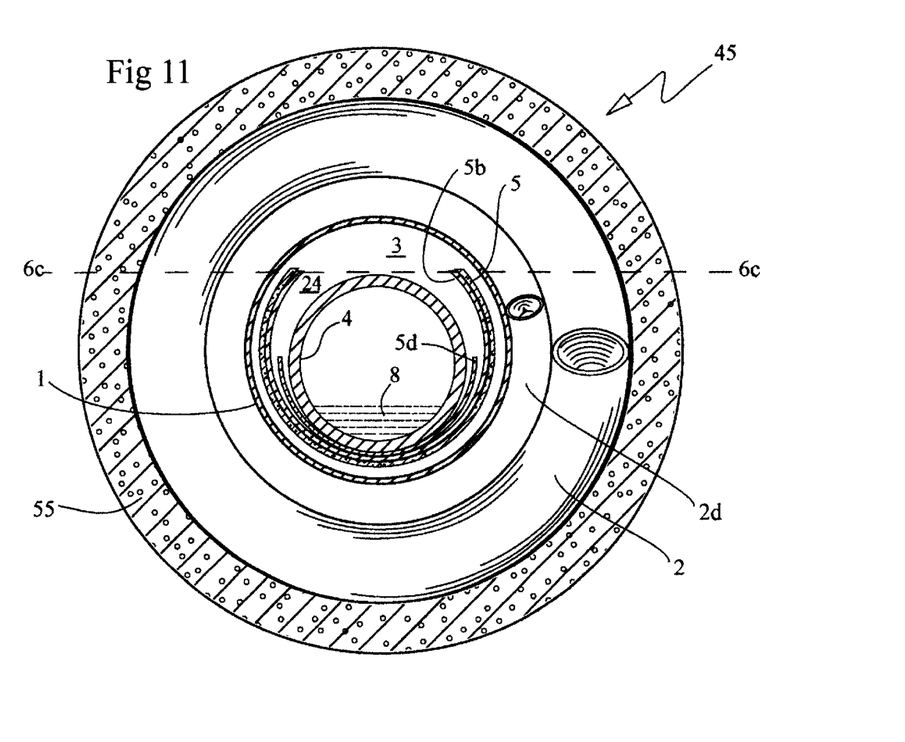
FIG. 11 is a cross section view of a horizontal embodiment for drainwater heat recovery where the cold water coil are two in number with one being copper the other plastic.

FIG. 10 shows a water cooler 60 having an inverted convection chamber to pass heat that rises therein to any cold drainwater. This keeps reservoir water 3 cold which in turn cooled cold water coil 2. Cold drainwater 8 causes chamber water to drop out of the chamber 5 cooling reservoir water 3. FIG. 11 shows a dual cold water coil the inner being smaller copper and the outer being larger plastic. Also shown are added fins 5d to drainpipe 4, level line 6c indicates the level of chamber water 24 that is affected by change in drainpipe temperature. The remaining reservoir water 3 is unaffected by cold drainwater 8 because chamber water 24 becomes heavier and stationary.

Figure 12:
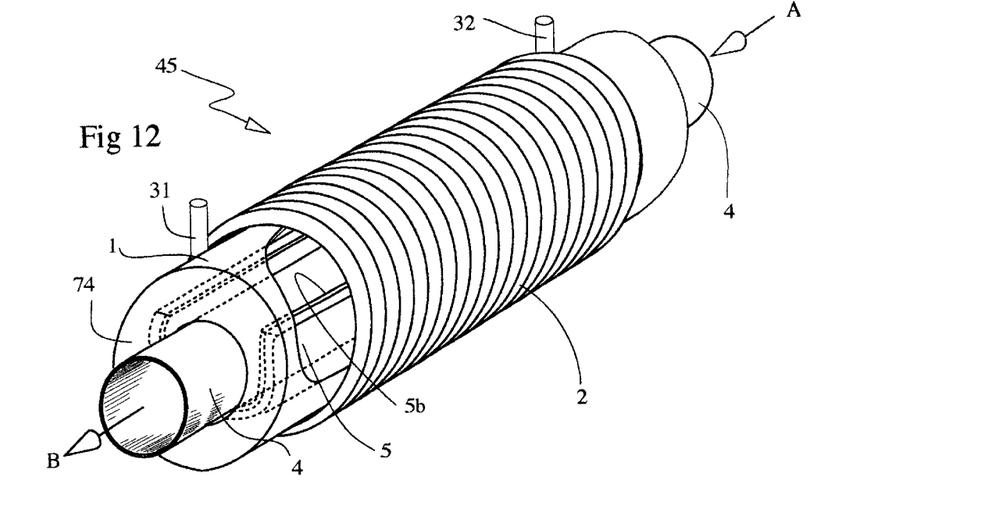
FIG. 12 is a perspective of a horizontal heat recovery unit showing the general relation ship of the components.
Figure 13:
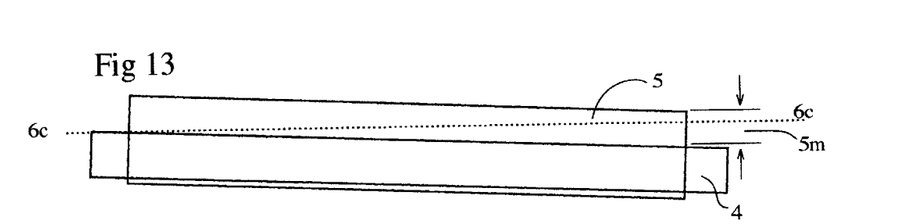
FIG. 13 is a side view of the drainpipe and convection chamber at a drain angle and showing how the convection chamber wall must be tall at the lower end to avoid cold water over spilling the chamber.
Figure 14:
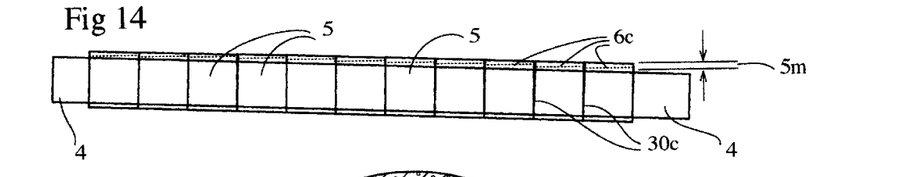
FIG. 14 shows the same as FIG. 13 with a compartmentalized convection chamber to reduce internal volume. The dividers also act as fins.
Figure 15:
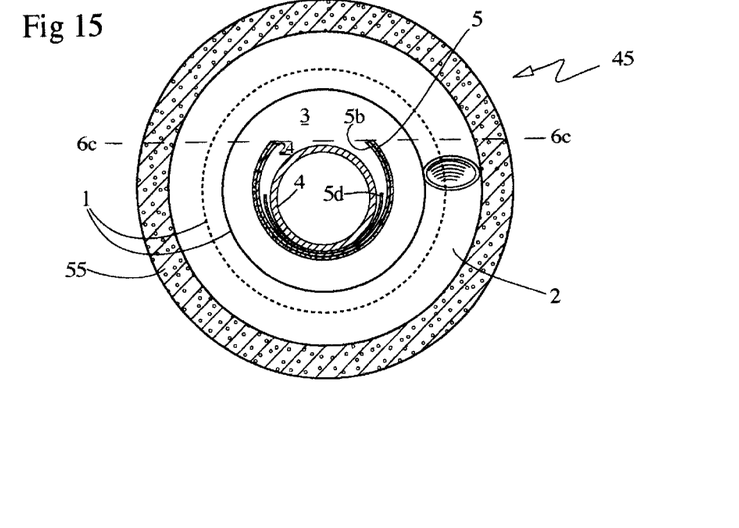
FIG. 15 shows another horizontal embodiment with a membrane reservoir and additional finning attached to the bottom of the drainpipe heat exchanger.

FIG. 12 shows a perspective of drainwater heat exchanger 45 and how the components earlier described fit together FIGS. 13 and 14 show a model of the horizontal convection chamber 5 where it is installed at a slight angle, common in plumbing drain systems. Here the water level 6c in the chamber 5 has a maximum depth 5m and so the chamber 5 must have high walls which therefore hold more water. A more preferred arrangement to minimize water in chamber 5 is shown in FIG. 14 where the chamber 5 is compartmentalized by dividers 30c, the water level 5m is much lower and therefore the desired minimum volume in the chamber 5 is attained. Dividers 30c also act as fins to enhance heat transfer many may be added to advantage.

Figure 16:
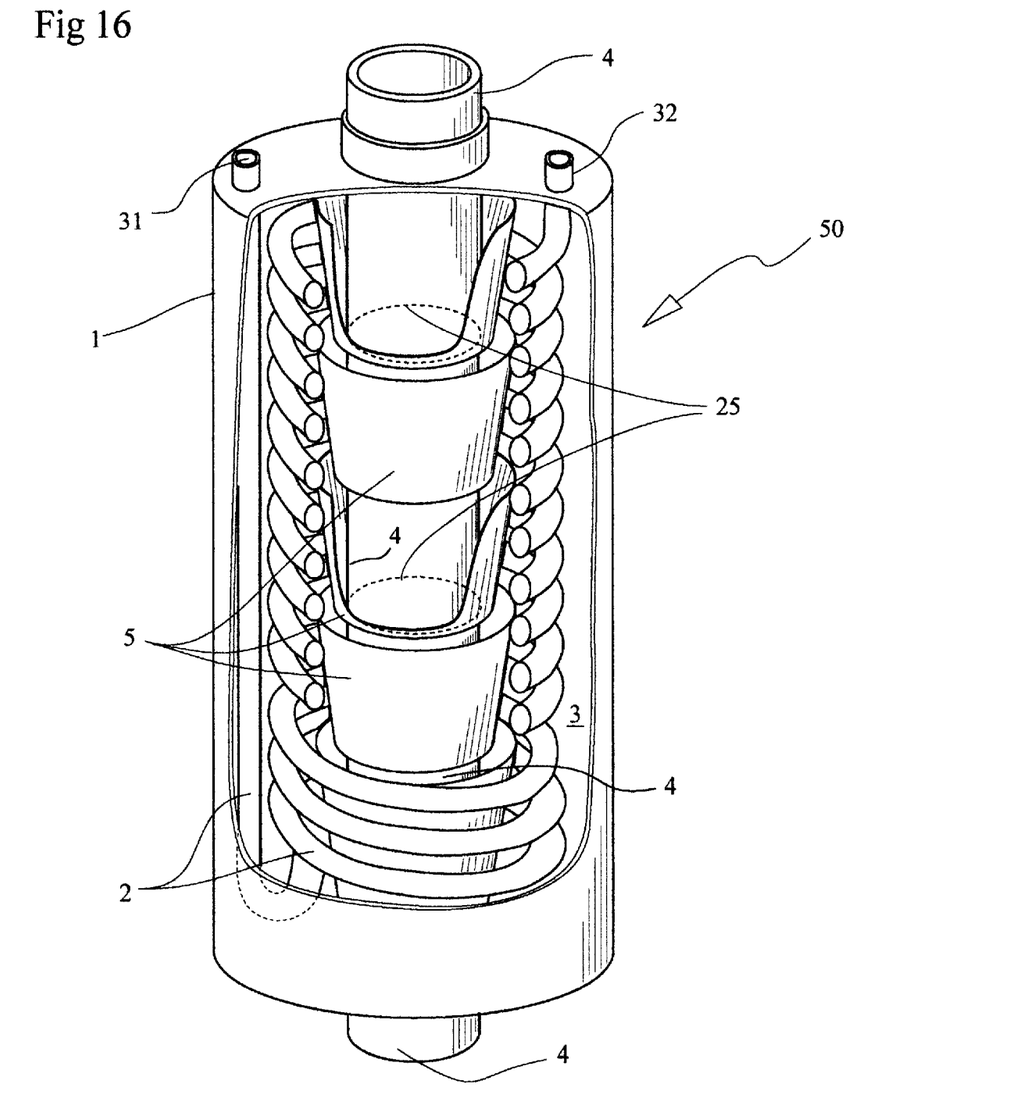
FIG. 16 shows a perspective of a vertical embodiment with internal cold water coil.

FIG. 16 is a perspective view of a vertical drainwater heat exchanger 50 showing the relationship to components already described.

Figure 17:
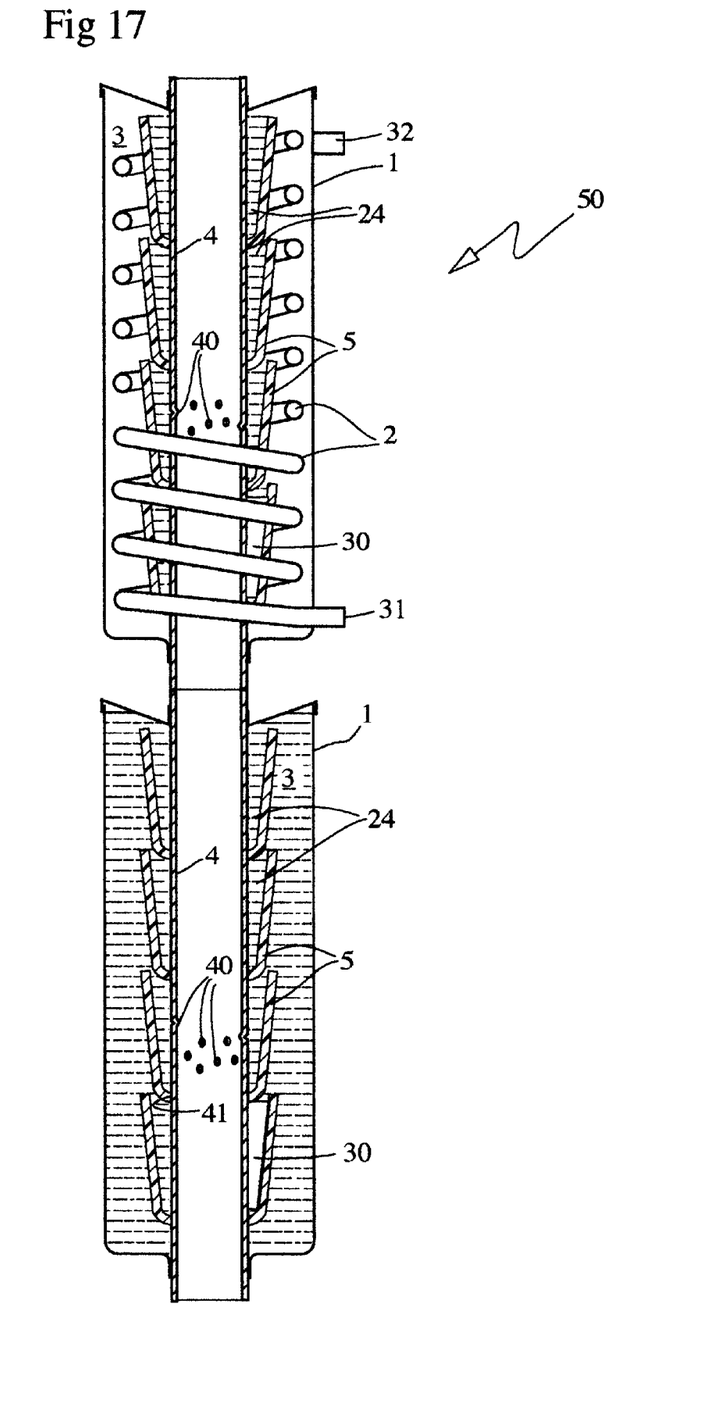
FIG. 17 shows a tandem arrangement of two shorter units. The upper one has the cold water coil removed and with no water filling it for clarity. The lower one has the cold water coil removed for clarity.

FIG. 17 shows how exchanger 50 can be added in series or tandem to improve performance. The cold water coils are removed from the lower unit and the reservoir water 3 is removed from the upper for clarity.

Figure 18:
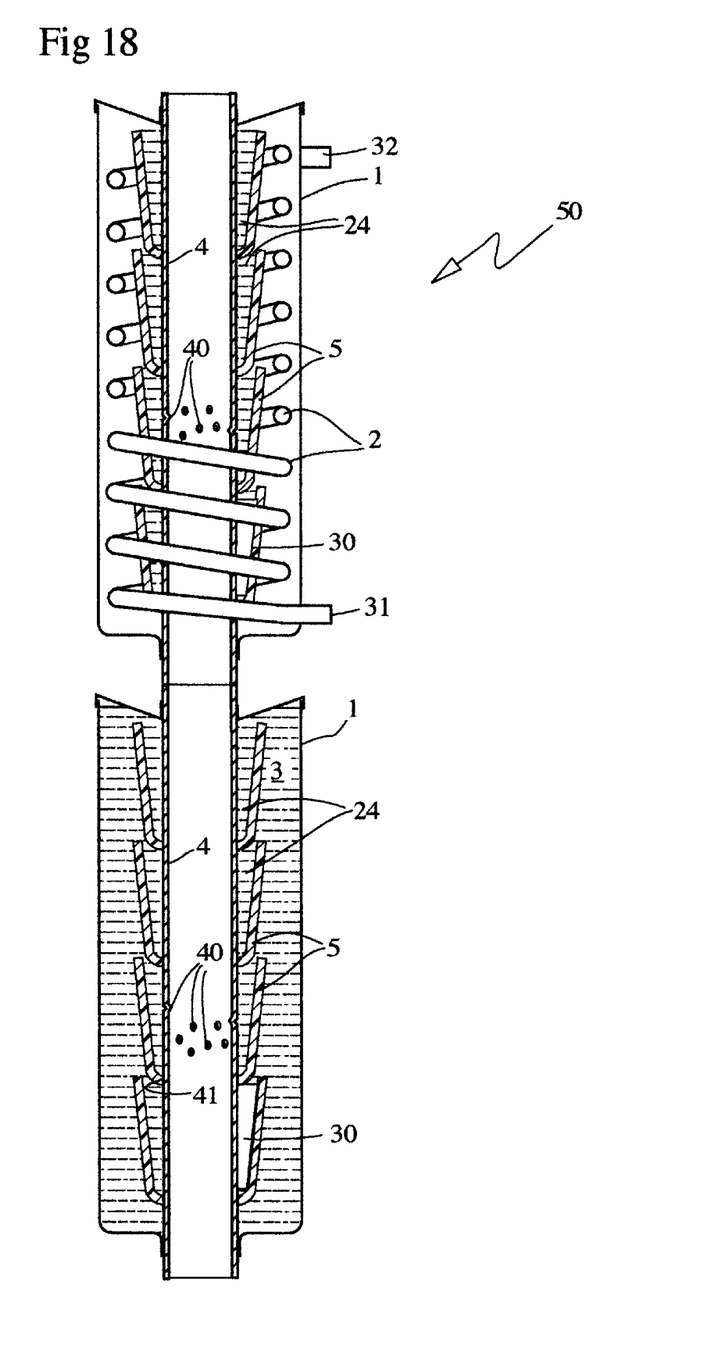
FIG. 18 shows a double drainpipe in parallel arrangement fed from a single source. The cold water coils are not shown but could be on the interior or exterior of the common reservoir.

FIG. 18 shows a parallel arrangement of two drainpipes 4 in a common reservoir 1. Convection chamber 5a shows an improved design that provides better convective flow.

Figure 19:
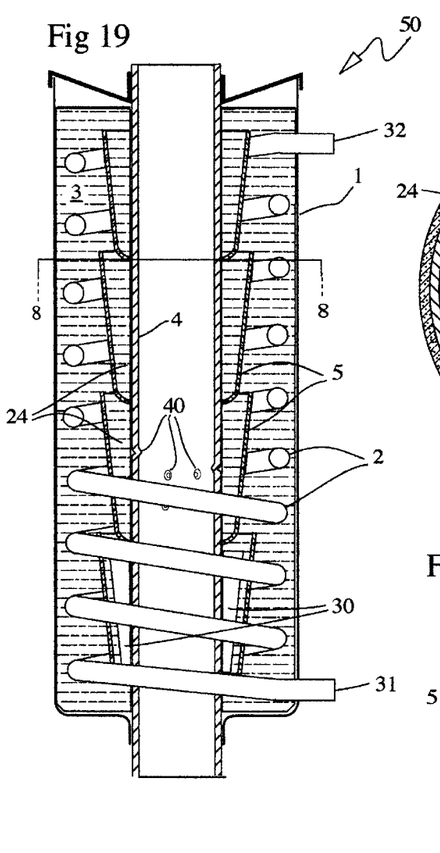
FIG. 19 shows a vertical embodiment with internal coil.
Figure 20:
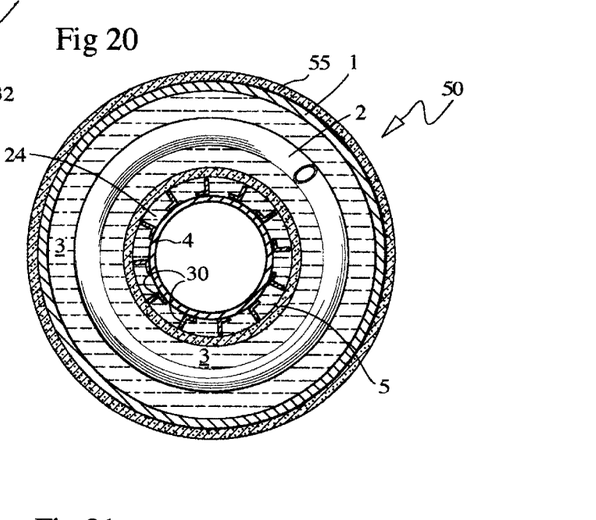
FIG. 20 shows a partial cross section top view of the same embodiment.
Figure 21:
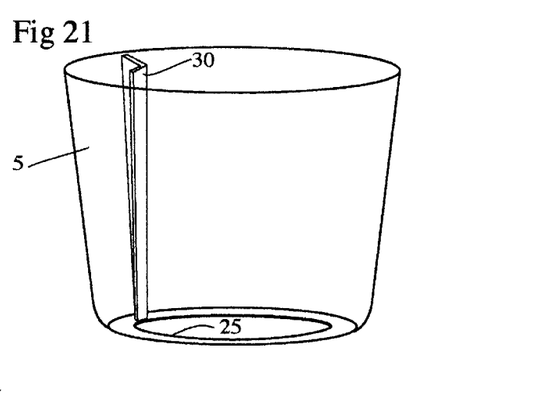
FIG. 21 shows single convection chamber for a vertical embodiment and with a single fin. The bottom hole fits tightly on the drainpipe.
Figure 22:
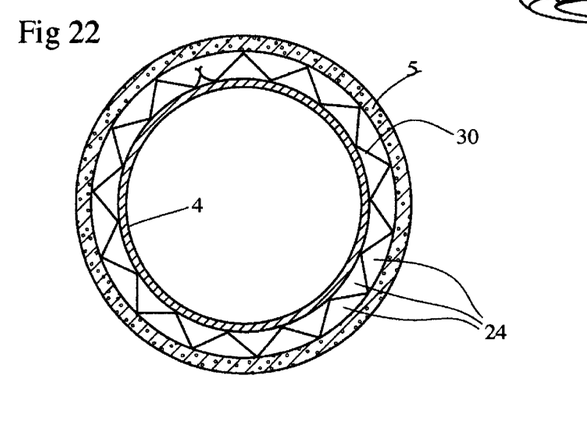
FIG. 22 shows a top view cross section of the convection chamber of FIG. 21 installed on a drainpipe and having a single bent metal fin surrounding the drainpipe.

FIG. 19 a vertical embodiment 50 with fins 30 showing in the lower chamber 5. FIG. 20 shows the same embodiment as FIG. 9 with cold water coil 2 added. FIG. 21 shows a single chamber 5 with a single fin 30 and the lower hole 25 that is sized to fit snugly on drainpipe 4 (not shown). FIG. 22 shows an alternate fin 30 made by folding one piece of sheet metal.

Figure 23:
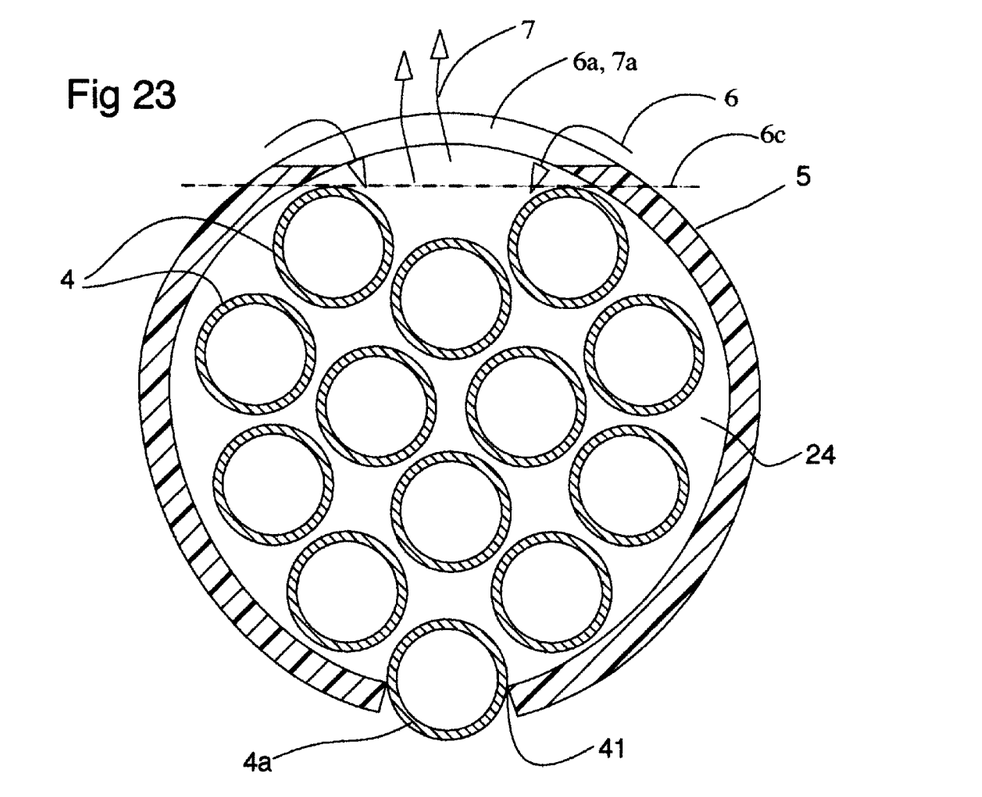
FIG. 23 shows a convection chamber filled with small diameter drainpipes suitable for use where drainwater does not carry large solids as, for example, a dishwasher.

FIG. 23 shows a chamber 5 having multiple small diameter drainpipes 5 which provide added heat transfer where the drainwater is free of large solids such a sin a dishwasher. Opening 41 in chamber 5 may be blocked by lower drainpipe 4a.

Figure 24:
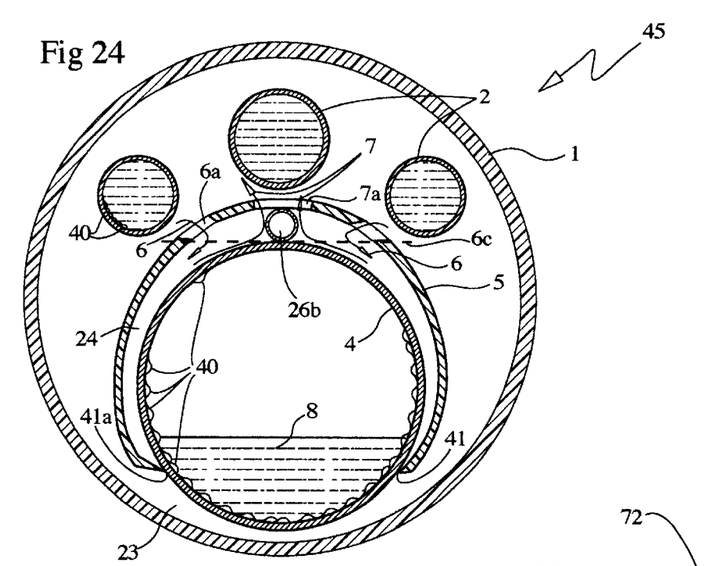
FIG. 24 is a cross section of a horizontal embodiment with a snap-on convection chamber that leaves the lower drainpipe exposed to the reservoir water and with straight internal cold water heat exchanger.
Figure 25:
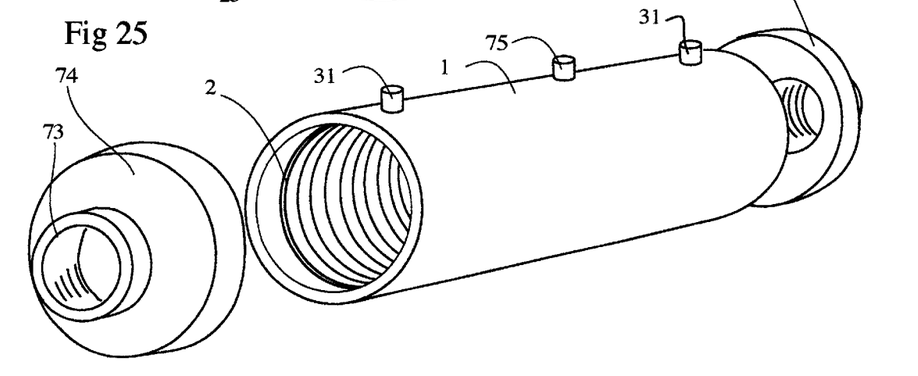
FIG. 25 is a perspective of a sold reservoir with internal cold water coil and glue welded end caps.
Figure 26:
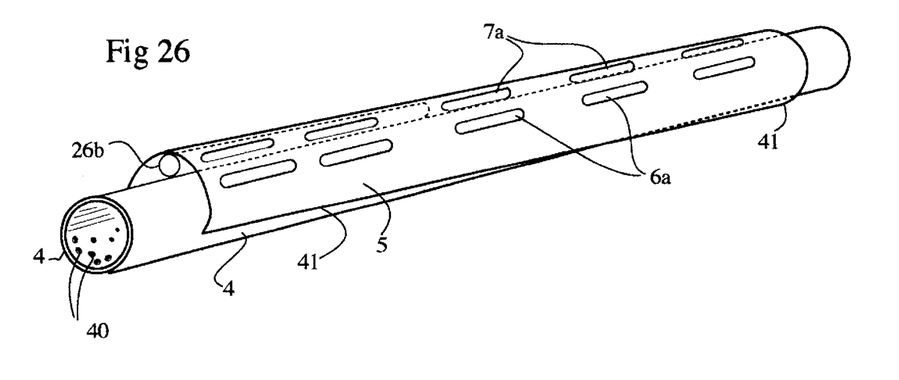
FIG. 26 is a perspective of the drainpipe convection chamber of FIG. 24.

FIG. 24 shows a cross section of drainwater heat exchanger 45 where the convection chamber 5 is a snap fit onto drainpipe 5 and is held from slipping down by spacer 26b. Dimples 40 are shown to increase turbulence. Lip 40 and alternate lip 41a show two ways to maintain convective flow at the bottom of chamber 5. FIG. 25 is a perspective of a possible arrangements of components already described. Filler spout 75 allows filling reservoir with water after installation. End caps 72 and 74 are glue sealed to reservoir 1. Drainpipe 4 (not shown) fits through sleeve 73. FIG. 26 shows a perspective of the embodiment of FIG. 24.

Figure 27:
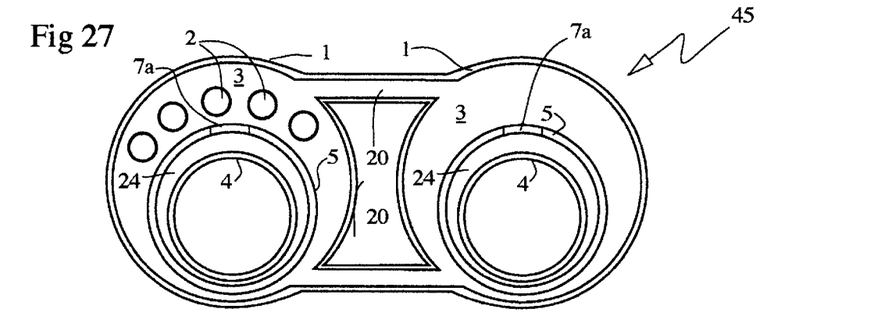
FIGS. 27 to 30 shown various methods of making the horizontal embodiment to minimize vertical space.
Figure 28:
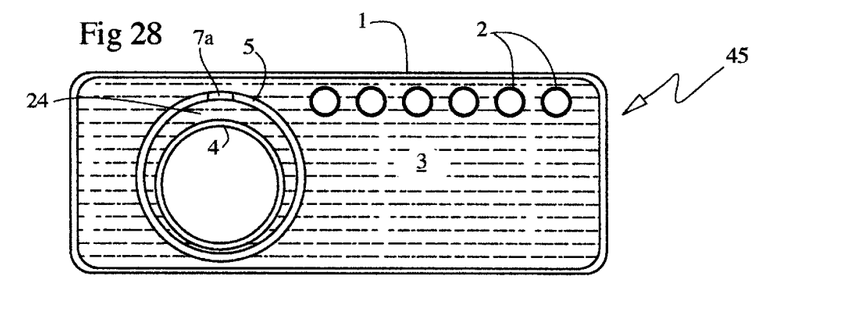
Figure 29:
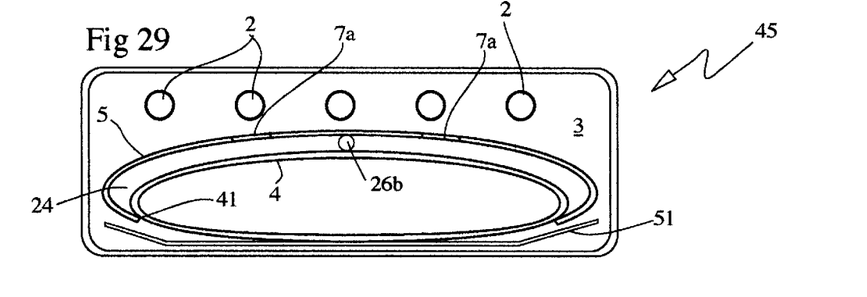
Figure 30:
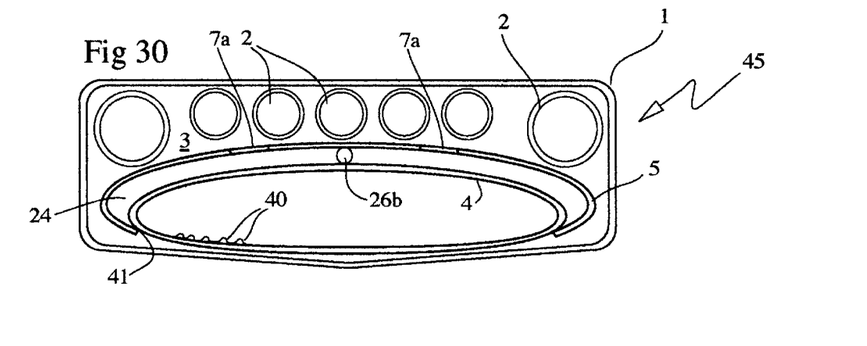

FIGS. 27 to 30 are horizontal drainwater heat exchangers 45 that depict various ways in which the components may be arranged to provide minimum vertical installation height. FIG. 27 shows two such units connected to a another reservoir 1 with connections 20. FIG. 28 shows how the cold water pipes or coils may be offset. In FIG. 29 the drainpipe 4 is ovalized to reduce height and a fin 51 is added. FIG. 30 shows the same embodiment with dimples 40 added to enhance turbulence.

Figure 31:
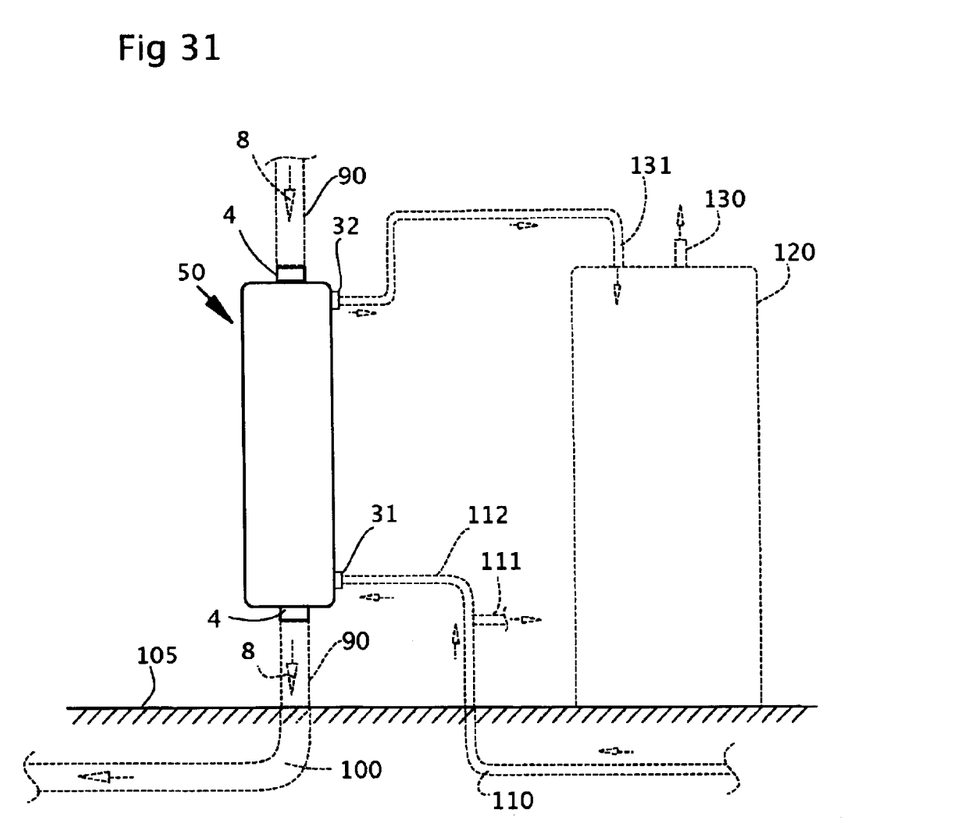
FIG. 31 shows a schematic of part of a plumbing system showing the vertical embodiment of the instant invention connected to a water heater.

FIG 31 has the vertical embodiment of the instant heat exchanger 50 with drainpipe 4 connected inline with buildings drainpipe 90 which leads into sewer pipe 100 under ground 105. Cold water in pipe 110 comes into building and branches into cold faucet water feed 111 and water heater feed 112 which plumbs into heat exchanger 50 at fitting 31 and out of heat exchanger 50 at fitting 32 and thence to inlet 131 of water heater 120 which delivers hot water to faucets via fining 130. Drainwater 8 flows through drainpipe 4 of heat exchanger 50. The horizontal embodiment of the instant invention (not shown) is plumbed in the same way.

In another embodiment, where laws permit, reservoir 1 of both vertical and horizontal embodiments may be pressurized with the cold water which to avoid the expense of a cold coils. Such an arrangement may also be used as a cold water preheater for non-potable water for toilet flushing. Such a warm water supply to a toilet would greatly reduce condensation and dripping, and the resultant water damage to the floor beneath toilets. Such wet areas also contribute significantly to mold and fungus growth in a building with attendant health hazards.

I claim:

1. In a plumbing system for a building, the plumbing system including a supply of a first cold water liquid and supply of a second liquid comprising drainwater, the improvement comprising an apparatus to transfer heat between said second liquid and said first liquid, said apparatus comprising at least one reservoir;

a third liquid substantially filling said at least one reservoir;

at least one first heat exchanger for said first liquid in thermal communication with at least a portion of said third liquid;

at least one second heat exchanger passing through the interior of said reservoir for said second liquid, said at least one second heat exchanger comprising tube means having at least one central portion and at least two end portions;

said at least one central portion having an exterior surface for heat transfer and at least one of said two end portions extending from said at least one reservoir for connection to said supply supply of drainwater;

at least one convection chamber means enclosing at least a substantial portion of said central portion of said second heat exchanger;

said at least one convection chamber means holding a fourth liquid comprising a relatively small volume of said third liquid;

said at least one convection chamber means having an exterior wall of thermal insulating material;

said fourth liquid submerging at least a substantial portion of said exterior surface of said at least one second heat exchanger;

said at least one convection chamber means having at least one unobstructed opening into said reservoir for convective heat transfer between said fourth liquid and said third liquid;

the arrangement being such that substantially all heat transfer with said second liquid takes place due to the resultant change in density of said fourth liquid, and that said third and first liquids are substantially only heated when said at least one unobstructed opening in said at least one convection chamber means is facing only upwardly, and that said third and first liquids are substantially only cooled when said at least one unobstructed opening in said at least one convection chamber means is facing only downwardly.

2. The improvement of claim 1 wherein said plumbing system includes means for heating said first cold water liquid, said apparatus being connected such that said cold water passes through said first heat exchange means prior to entering said means for heating said cold water.

3. The improvement of claim 1 wherein said second heat exchange means is connected to a water disposal conduit from an appliance generating heated drainwater.

4. The improvement of claim 1 wherein said first heat exchange means is connected to a toilet flushing reservoir.

5. The improvement of claim 1 wherein said first heat exchange means is connected to a washing machine.

6. The improvement of claim 1 wherein said building is a residential house.

7. The improvement of claim 1 wherein said third liquid is water.

8. The improvement of claim 1 further including means to disturb the boundary layer of liquid about at least one of said first and second heat exchange means.

9. The improvement of claim 1 wherein at least one of said first and second heat exchange means comprise at least one tube having a plurality of inwardly directed dimples to thereby create turbulence in liquid flowing therethrough, said dimples being spaced sufficiently close together to provide continuous turbulence in said liquid passing therethrough.

10. The improvement of claim 1 further including a plurality of said apparatuses connected in a plumbing system, said apparatuses being connected in series or in parallel or in series-parallel.

11. A heat transfer system suitable for recovering heat from drainwater comprising:

a reservoir having a liquid therein;

a second heat exchanger within said reservoir for receiving said drainwater; said second heat exchanger having a second heat exchanger inlet and a second heat exchanger outlet;

a first heat exchanger in thermal communication with said liquid, said first heat exchanger having a first heat exchanger inlet and a first heat exchanger outlet;

convection chamber means at least partially surrounding said second heat exchanger, said convection chamber means being thermally insulative;

said convection chamber means having an opening therein allowing convection of said liquid into and out of said convection chamber means when said drainwater flowing through said second heat exchanger means is warmer than said liquid, said convection chamber means being arranged such that convective movement of said liquid from adjacent said second heat exchanger is impeded when said drainwater flowing therethrough is colder than said liquid.

12. The heat transfer system of claim 11 wherein said second heat exchanger includes a second heat exchanger conduit extending in a generally horizontal direction, said heat transfer system including a first heat exchanger conduit also extending in a generally horizontal direction, said second heat exchanger conduit being located below said first beat exchanger conduit in said reservoir.

13. The heat transfer system of claim 12 wherein said convection chamber means comprises a horizontally extending convection chamber encircling at least an upper portion of said horizontally extending second heat exchanger conduit.

14. The heat transfer system of claim 12 further including spacers spacing said convection chamber means from said second heat exchanger conduit.

15. The heat transfer system of claim 12 wherein said convection chamber means has a plurality of longitudinally extending slots formed therein.

16. The heat transfer system of claim 11 wherein said second heat exchanger comprises a vertically extending conduit within said reservoir, said first heat exchanger comprising a coiled conduit coiled about said second heat exchanger conduit and spaced therefrom.

17. The heat transfer system of claim 16 wherein said convection chamber means comprises a plurality of upwardly and outwardly extending flanges secured to said second heat exchanger conduit.

18. In a plumbing system for a building, the plumbing system including a cold water supply and a water disposal conduit, the improvement comprising an apparatus to transfer heat from said cold water to said drainwater in said water disposal conduit, said apparatus comprising a reservoir;

a third liquid substantially filling said reservoir;

a second heat exchanger for said drainwater;

a first heat exchanger having cold water from said cold water supply in thermal communication with said third liquid;

convection chamber means at least partially surrounding said second heat exchanger, said convection chamber means being made of thermally insulative material and having an opening therein allowing convection of said third liquid into and out of said convection chamber means, said opening being located only at a lower portion of said convection chamber means, the arrangement being such to cool said cold feed water by permitting convection of said fluid into and out of said convection chamber when said drainwater is colder than said fluid, and, minimizing flow of said third liquid out of said convection chamber means when said drainwater is hotter than said third liquid.

19. A heat exchanger for drainwater comprising, second heat exchange means, reservoir means enclosing said second heat exchange means, first heat exchange means, liquid substantially filling said reservoir means, said liquid in thermal communication with said first and second heat exchange means, at least one convection chamber means enclosing said second heat exchange means, said convection chamber means being thermally insulative, said convection chamber means filled with said liquid, said convection chamber means having at least one convection opening therein allowing convection of said liquid into and out of said convection chamber means, the whole arranged to provide one-way heat transfer from or to drainwater by orienting said convection opening upwardly or downwardly respectively.

* * * * *